US012254735B2

(12) United States Patent
Jovanovic et al.

(10) Patent No.: US 12,254,735 B2
(45) Date of Patent: Mar. 18, 2025

(54) PROVIDING NAVIGATION AND CONSTRUCTION OF SPORTS WAGERS ON A PLAYER TERMINAL AND RELATED SYSTEMS AND METHODS

(71) Applicant: IGT, Las Vegas, NV (US)

(72) Inventors: Vladimir Jovanovic, Henderson, NV (US); David Pricker, Belgrade (RS); Borivoj Grujic, London (GB); Vladimir Djokic, IV, Belgrade (RS)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 18/320,393

(22) Filed: May 19, 2023

(65) Prior Publication Data

US 2023/0290213 A1   Sep. 14, 2023

Related U.S. Application Data

(63) Continuation of application No. 17/386,002, filed on Jul. 27, 2021, now Pat. No. 11,688,227.

(51) Int. Cl.
*G07F 17/32* (2006.01)
*G06F 3/0488* (2022.01)
*G06Q 50/34* (2012.01)

(52) U.S. Cl.
CPC ........ *G07F 17/3211* (2013.01); *G06F 3/0488* (2013.01); *G06Q 50/34* (2013.01); *G07F 17/3288* (2013.01)

(58) Field of Classification Search
None
See application file for complete search history.

(56) References Cited

U.S. PATENT DOCUMENTS

| | | |
|---|---|---|
| 2005/0208995 A1 | 9/2005 | Marshall |
| 2008/0234051 A1 | 9/2008 | McNutt |
| 2016/0300430 A1* | 10/2016 | Ortiz ..................... G07F 17/326 |
| 2019/0075199 A1* | 3/2019 | Tseng ..................... G06F 3/0481 |
| 2021/0090380 A1 | 3/2021 | Abrahamson |
| 2022/0270446 A1* | 8/2022 | Inamdar ............... G06Q 20/401 |
| 2022/0292919 A1* | 9/2022 | Edsall ................. G07F 17/3244 |

* cited by examiner

*Primary Examiner* — Ronald Laneau
(74) *Attorney, Agent, or Firm* — Sage Patent Group

(57) ABSTRACT

A system, computer-implemented method and gaming device are provided. A system includes a processor circuit, a memory coupled to the processor circuit. The memory includes machine-readable instructions that cause the processor circuit to generate a graphical user interface (GUI) that includes two axis display control to determine a selected event group from multiple event groups and to determine multiple events from multiple events, receive wager amount data and wager type data via the GUI, after receiving the wager amount data and the wager type data via the GUI, receive event selection inputs corresponding to the events and determine an aggregate total amount of wager investment and winnings based on outcomes of selected ones of the events.

19 Claims, 11 Drawing Sheets

FIG. 6

PROVIDING NAVIGATION AND CONSTRUCTION OF SPORTS WAGERS ON A PLAYER TERMINAL AND RELATED SYSTEMS AND METHODS

CROSS REFERENCE TO RELATED APPLICATIONS

The present application is a continuation of U.S. patent application Ser. No. 17/386,002, filed Jul. 27, 2021, entitled, "PROVIDING NAVIGATION AND CONSTRUCTION OF SPORTS WAGERS ON A PLAYER TERMINAL AND RELATED SYSTEMS AND METHODS," the disclosure and content of which is incorporated herein in its entirety.

BACKGROUND

Embodiments described herein relate to providing opportunities for betting on events. Events, such as sporting events have many aspects that make them attractive to spectators, both from an entertainment standpoint and a wagering and/or betting standpoint. Sports wagering on mobile devices, such as user associated terminals, continues to increase. Mobile sports wagering applications may be complex because limited screen space may force multiple screen layouts and drill down, which may result in an increased number of clicks for each wager. While abundant options offered in mobile wagering applications may appeal to advanced bettors, such abundance may deter recreational bettors. As technology improves and as the competition for the attention of bettors increases, there is a need for an improved interface for sports wagering on mobile devices.

SUMMARY

According to some embodiments, a system for constructing sports wagers includes a processor circuit and a memory coupled to the processor circuit. The memory includes machine-readable instructions that, when executed by the processor circuit, cause the processor circuit to generate a GUI that includes two axis display control to determine a selected event group from multiple event groups and to determine multiple events from multiple events, receive wager amount data and wager type data via the GUI, after receiving the wager amount data and the wager type data via the GUI, receive event selection inputs corresponding to the events, and determine an aggregate total amount of wager investment and winnings based on outcomes of selected ones of the events.

Some embodiments are directed to a computer-implemented method of operating a gaming device. Operations according to such methods include receiving wager data corresponding to multiple events and wagers, generating a graphical user interface (GUI) on a display device that receives an input that corresponds to a wager, wherein the input includes a first wager input, a second wager input and a third wager input, receiving, via the graphical user interface, the first wager input that selects a wagering type, after receiving the first wager input, receiving, via the graphical user interface, the second wager input that selects a wagering amount, after receiving the second wager input, receiving, via the graphical user interface, the third wager input that selects a first event of the events corresponding to the wager that is based on the first wager input and the second wager input, and sending, via a communication interface and to a wagering server, constructed wager data corresponding to the wager defined by the first wager input, the second wager input and the third wager input.

Some embodiments are directed to a gaming device that includes a display device, a processor circuit, and a memory coupled to the processor circuit. The memory includes machine-readable instructions that, when executed by the processor circuit, cause the processor circuit to receive, from a wagering data server, wager data corresponding to multiple events and wagers and generate a graphical user interface (GUI) on the display device that receives, via the touch screen input a first wager input, a second wager input and a third wager input. The first wager input selects a wagering type. After receiving the first wager input, the second wager input selects a wagering amount. After receiving the second wager input, the third wager input selects multiple ones of the events corresponding to the wager that is based on the first wager input and the second wager input and constructed wager data corresponding to the wager defined by the first wager input, the second wager input and the third wager input is sent to the wagering server via a communication interface and to the.

BRIEF DESCRIPTION OF THE DRAWINGS

FIG. 6 includes two schematic front views of a mobile device displaying a screenshot of a graphical user interface as illustrated in FIG. 4 for constructing a parley wager according to some embodiments.

DETAILED DESCRIPTION

Figure 1:
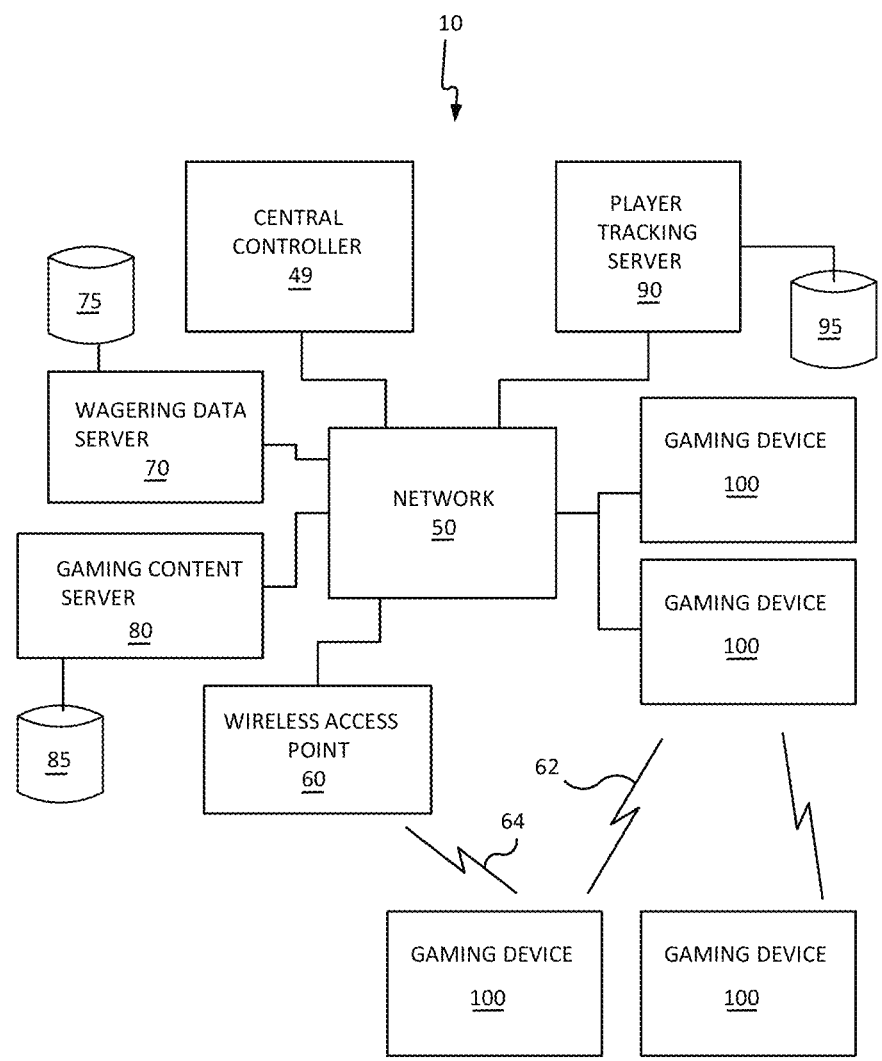
FIG. 1 is a schematic block diagram that illustrates a system including a plurality of gaming devices according to some embodiments.

Sports wagering on mobile devices has experienced steady growth, however mobile application design has not kept up. Mobile sports wagering applications may be complex because limited screen space forces multiple screen layouts and drill-downs to provide navigation, both of which increase the number of clicks.

Mobile wagering applications offer many options. Abundant options appeal to advanced but deter recreational players. Conventional applications may generally follow a similar wager construction workflow of selecting one or more event/game outcomes and assigning it into a virtual betting slip (much like a like a virtual shopping cart), choosing the type of wager (straight, parlay, round-robin, etc.), and specifying the wager amount (investment) or prospective winning. Conventionally the virtual betting slip is on a separate page, while the choosing and electing operations may require the virtual betting slip.

Embodiments herein are directed to various systems, devices and methods for sports betting that use graphical user input techniques to provide navigation and construction of sports wagers on a player terminal, for placing a sports wager on a live sporting event during the live sporting event. Specifically, embodiments herein provide a user interface that is a technical solution that addresses the problem corresponding to the amount of time it takes to define and place a wager on specific outcomes occurring during a live sporting event.

Some embodiments herein provide a mobile application having an unconventional user interface for constructing sports wagers on a touch device, such as a player mobile device and/or kiosk. Embodiments herein provide wager constructions with a minimal number of clicks and thus unique user experiences.

Further, events/games as disclosed herein may include live sporting events such as professional sporting events, amateur and/or collegiate sporting events among others. Sporting events may include any team sport or contest and/or any individual sport or contest. Sports may include any sports corresponding to balls, pucks, stones, swords, cards, dice, trivia knowledge, tracks, hurdles, javelins, rackets, firearms, bows, and/or weights, among others. Streaming sporting events may include virtual sporting events in which real or virtual sporting participants are depicted in a virtually presented event and/or contest. Outcomes of such virtual sporting events may be determined by rule-based operation of the sporting event that may include random determinations regarding in-play outcomes.

Embodiments disclosed herein may be performed using a gaming device to perform sports betting. As used herein, a gaming device may include mobile devices, personal computers, kiosks and/or sports betting terminals, among others. The in-play sports bet is a real time bet in which the user predicts the actions of the team or team member or the result of the team in the near future such as the next down, next service, next possession and/or next turn. The user can wager real money, virtual money and/or points.

In a typical wager sequence in which the player begins by selecting one or more game/event outcomes first, then selects a wager type and finally enters the wager amount. Embodiments herein provide that first the player selects a wager type and the amount. As a last operation, the user selects one or more event (game) outcomes after the wager type and event. Such embodiments may be particularly advantageous for players who tend to wager the same bet types and similar amounts corresponding to multiple different game/event outcomes.

Further, some embodiments may reduce underlying wagering complexity by presenting outcomes in terms of prospective profits and/or investments without the player having to switch screens. In such embodiments, the player may decide to view the wagers in terms of the amount to wager (investment) and/or the amount to win (profit).

Some embodiments provide that the player may be able to select whether to play a straight wager or to play parlay wagers. If the player selects the amount to wager, embodiments herein may calculate and display prospective winnings adjacent offered outcomes. Responsive to the player choosing the amount to win, embodiments may calculate and display the required wager amounts adjacent outcomes (selections). In some embodiments, the calculations may follow standard wagering mathematics. Some embodiments provide that, for parlay wagers, the calculated values may accumulate with previously selected outcomes.

Embodiments herein may combine the presentation of a sports offer (events and outcomes) with the wager section on the same screen to improve a user experience relative to conventional approaches. By reducing the number of inputs that a player need to perform betting sports betting operation on a mobile device, the computational efficiency of embodiments herein is improved over conventional approaches.

By scrolling up and down the event/game list, the player positions the desired event/game under a fixed wager section to see and bet on event/game outcomes. The stationary wager section may act as a magnifier presenting details of the event that is currently in focus.

While swiping up and down the event/game list may allow the player to navigate between the games within one event group (e.g., one sport), swiping left and right on the event/game list may allow the player to alter between different event groups (e.g., switch between sports). Some embodiments provide that haptic feedback may be provided to accentuate event scrolling and to improve user experience.

For tracking a wagering game player in a casino or other wagering venue, some embodiments herein may further include real-time or substantially real-time player tracking functions to keep track of the player wagering data and/or positions during the live streaming event. For example, since a wagering session may include many wagers that are placed and resolved in a very short period of time, data may be continuously and/or periodically updated to include data regarding number of wins/losses, amount won/lost, and/or a balance of funds available for subsequent wagering, among others. In some embodiments, the player data and/or positions may be provided to a central server that may be in communication with a gaming device.

Reference is now made to FIG. 1, which is a schematic block diagram that illustrates a system including a plurality of gaming devices according to some embodiments. The system 10 may be located, for example, on the premises of a gaming establishment, such as a casino, in a private residence, or may include components that are located at different locations. The gaming devices 100 may be in communication with each other and/or a central controller 49 through a data communication network 50, or remote communication link. The data communication network 50 may be a private data communication network that is operated, for example, by the gaming facility that operates the gaming device 100, a publicly accessible data communication network such as the Internet, or a combination thereof. Communications over the data communication network 50 may be encrypted for security. The central controller 40 may be any suitable server or computing device which includes at least one processing circuit, such as a processor, and at least one memory or storage device. Each gaming device 100 may include a processing circuit that transmits and receives events, messages, commands or any other suitable data or signal between the gaming device 100 and the central controller 49 and/or other gaming devices 100.

The gaming device processor is operable to execute such communicated events, messages or commands in conjunction with the operation of the gaming device 100. Moreover, the processor of the central controller 49 is configured to transmit and receive events, messages, commands or any other suitable data or signal between the central controller 49 and each of the individual gaming devices 100. In some embodiments, one or more of the functions of the central controller 49 may be performed by one or more gaming device processors. Moreover, in some embodiments, one or more of the functions of one or more gaming device processors as disclosed herein may be performed by the central controller 49.

A wireless access point 60 provides wireless access to the data communication network 50. The wireless access point 60 may be connected to the data communication network 50 as illustrated in FIG. 1, or may be connected directly to the central controller 49 or another server connected to the data communication network 50.

One or more content servers, such as a wagering data server 70 and a gaming content server 80, may also be connected through the data communication network 50. The wagering data server 70 may manage delivery of streaming data corresponding to sports betting to a user of a gaming device 100. The streaming data content may be stored in a wagering data database 75. Similarly, the gaming content server 80 may manage delivery of the gaming content to the user of a gaming device 100. The gaming content may be stored in a gaming content database 85. The wagering data server 70 and a gaming content server 80 may be implemented within or separately from each other. The wagering data server 70 and a gaming content server 80 may also be implemented within or separately from the central controller 40.

A player tracking server 90 may also be connected through the data communication network 50. The player tracking server 90 may manage a player tracking account that tracks the gameplay and spending and/or other player preferences and customizations of a player, i.e., the user of the gaming device 100, manages loyalty awards for the player, manages funds deposited or advanced on behalf of the player, and other functions. Player information managed by the player tracking server 90 may be stored in a player information database 95.

The gaming devices 100 communicate with one or more elements of the system 10 to coordinate providing sports wagering data and synchronized gaming content. For example, in some embodiments, a gaming device 100 may communicate directly with another gaming device 100 over a wireless interface 62, which may be a WiFi link, a Bluetooth link, an NFC link, etc. In other embodiments, the gaming device 100 may communicate with the data communication network 50 (and devices connected thereto, including EGMs) over a wireless interface 64 with the wireless access point 160. The wireless interface 64 may include a WiFi link, a Bluetooth link, an NFC link, etc. In still further embodiments, the gaming device 100 may communicate with other gaming devices 100 or other devices over the wireless interface 62 and the wireless access point 60 over the wireless interface 64. In these embodiments, the wireless interface 62 and the wireless interface 64 may use different communication protocols and/or different communication resources, such as different frequencies, time slots, spreading codes, etc. For example, in some embodiments, the wireless interface 62 may be a Bluetooth link, while the wireless interface 64 may be a WiFi link.

The wireless interfaces 62, 64 allow the gaming devices 100 and/or central controller 40 to coordinate providing wagering data and synchronized gaming content to the gaming devices 100.

In some embodiments, the central controller 40, wagering data server 70 and/or gaming content server 80 may coordinate the generation and display of sports wagering data and the synchronized gaming content for wagering on sporting events to more than one user and/or to more than one gaming device 100. As described in more detail below, this may enable multiple users to interact with the wagering data and/or gaming content in real time. This feature can be used to provide a shared multiplayer experience to multiple users at the same time. Moreover, in some embodiments, the central controller 40, wagering data server 70 and/or gaming content server 80 may coordinate the generation and display of the sports wagering data and the synchronized gaming content to users at different physical locations.

Figure 2:
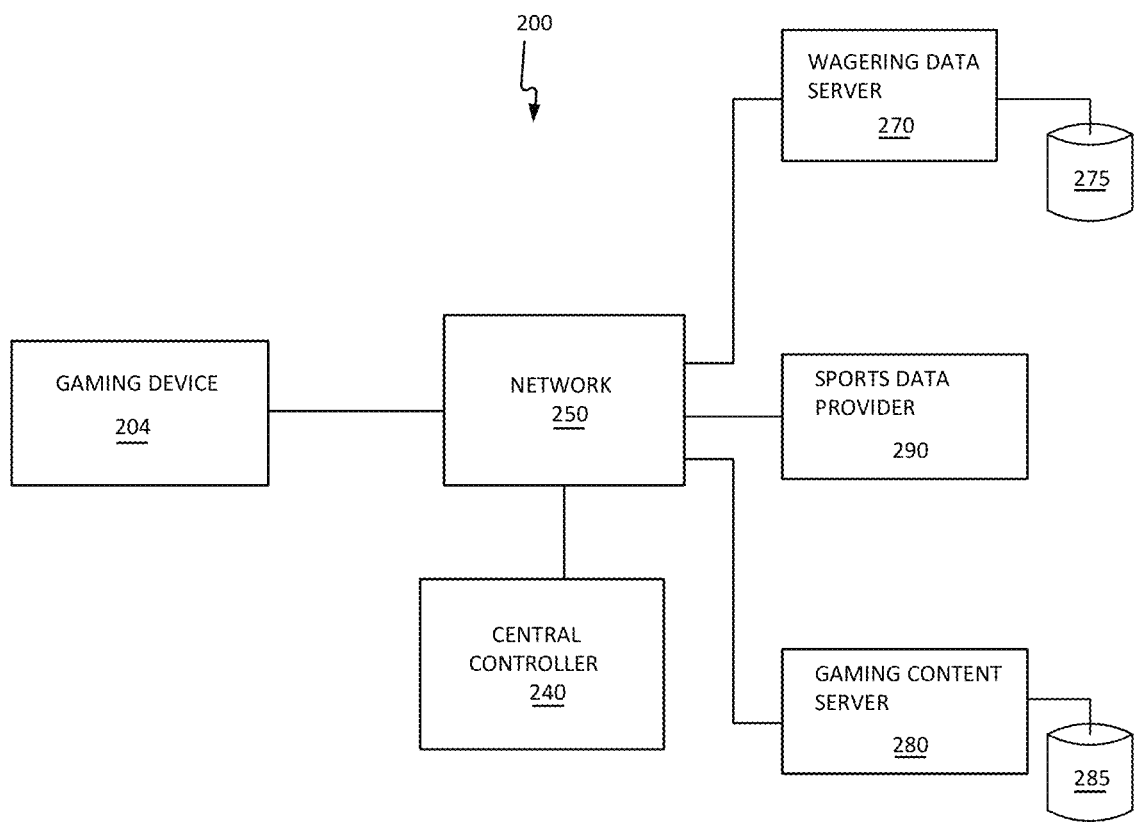
FIG. 2 is a schematic block diagram illustrating network configurations for a system including a wagering data server and a gaming content server according to some embodiments.

Reference is now made to FIG. 2, which a schematic block diagram illustrating network configurations for a system including a wagering data server and a gaming content server according to some embodiments. The system 200 may include a gaming device 204 and a central controller 240 for providing streaming video content and gaming content to a user via the gaming device 204. In this example, the gaming device 204 is connected to the central controller 240 via a network 250, but it should be understood that the central controller 240 in some embodiments may be part of the gaming device 204 or may be connected to the gaming device 204 via a direct wired or wireless connection as well. A wagering data server 270 and a gaming content server 280 are also connected to the central controller 240 via the network 250 in this example.

In some embodiments, a sports data provider 290 may evaluate the outcomes of events related to in-play wagers and provide an indication regarding the outcome of the wagers. In some embodiments, the sports data provider 290 may provide a set of results corresponding to given events in the sports games. For example, in the context of football, a set of results may include data corresponding to run, pass, number of yards lost or gained, player number, play type correlation, line of scrimmage, and/or occurrences such as fumble, foul, interception, and/or scoring, among others. Any of the gaming device 204, the central controller 240, and the gaming content server 280 may use the sports data from the sports data provider to resolve the outcomes of in-play wagers.

Figure 3:
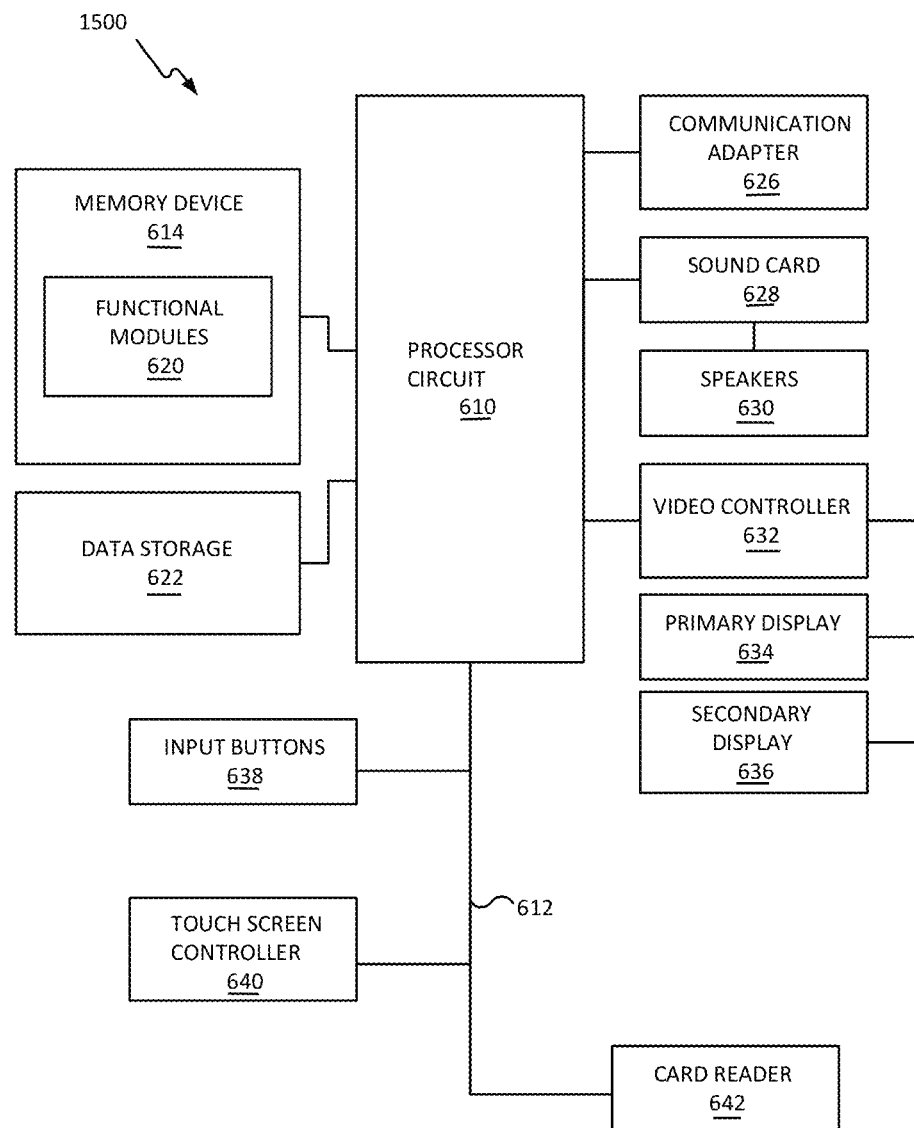
FIG. 3 is a schematic block diagram that illustrates various components of a computing device, which may embody or be included as part of the devices, systems, and/or components above, according to some embodiments.

Reference is now made to FIG. 3, which is a schematic block diagram that illustrates various components of a computing device, which may embody or be included as part of the devices, systems, and/or components above, according to some embodiments. As shown in FIG. 3, the computing device 1500 may include a processor circuit 610 that controls operations of the computing device 1500. Although illustrated as a single processor, multiple special purpose and/or general-purpose processors and/or processor cores may be provided in the computing device 1500. For example, the computing device 1500 may include one or more of a video processor, a signal processor, a sound processor and/or a communication controller that performs one or more control functions within the computing device 1500. The processor circuit 610 may be variously referred to as a "controller," "microcontroller," "microprocessor" or simply a "computer." The processor circuit 610 may further include one or more application-specific integrated circuits (ASICs).

Various components of the computing device 1500 are illustrated in FIG. 3 as being connected to the processor circuit 610. It will be appreciated that the components may be connected to the processor circuit 610 and/or each other through one or more busses 612 including a system bus, a communication bus and controller, such as a USB controller and USB bus, a network interface, or any other suitable type of connection.

The computing device 1500 further includes a memory device 614 that stores one or more functional modules 620 for performing the operations described above. Alternatively, or in addition, some of the operations described above may be performed by other devices connected to the network, such as the network 50 of the system 10 of FIG. 1, for example. The computing device 1500 may communicate with other devices connected to the network to facilitate performance of some of these operations. For example, the computing device 1500 may communicate and coordinate with certain displays to identify elements of a race being displayed by a particular display.

The memory device 614 may store program code and instructions, executable by the processor circuit 610, to control the computing device 1500. The memory device 614 may include random access memory (RAM), which can include non-volatile RAM (NVRAM), magnetic RAM (ARAM), ferroelectric RAM (FeRAM) and other forms as commonly understood in the gaming industry. In some embodiments, the memory device 614 may include read only memory (ROM). In some embodiments, the memory device 614 may include flash memory and/or EEPROM (electrically erasable programmable read only memory). Any other suitable magnetic, optical and/or semiconductor memory may operate in conjunction with the gaming device disclosed herein.

The computing device 1500 may include a communication adapter 626, which may also be referred to as a communication interface and that enables the computing device 1500 to communicate with remote devices, such as the wireless network, another computing device 1500, and/or a wireless access point, over a wired and/or wireless communication network, such as a local area network (LAN), wide area network (WAN), cellular communication network, or other data communication network, e.g., the network 50 of FIG. 1.

The computing device 1500 may include one or more internal or external communication ports that enable the processor circuit 610 to communicate with and to operate with internal or external peripheral devices, such as a sound card 628 and speakers 630, video controllers 632, a primary display 634, a secondary display 636, input buttons 638 or other devices such as switches, keyboards, pointer devices, and/or keypads, a touch screen controller 640, a card reader 642, currency acceptors and/or dispensers, cameras, sensors such as motion sensors, mass storage devices, microphones, haptic feedback devices, and/or wireless communication devices. In some embodiments, internal or external peripheral devices may communicate with the processor through a universal serial bus (USB) hub (not shown) connected to the processor circuit 610. Although illustrated as being integrated with the computing device 1500, any of the components therein may be external to the computing device 1500 and may be communicatively coupled thereto. Although not illustrated, the computing device 1500 may further include a rechargeable and/or replaceable power device and/or power connection to a main power supply, such as a building power supply.

In some embodiments, the computing device 1500 may include a head mounted device (HMD) and may include optional wearable add-ons that include one or more sensors and/or actuators. Including ones of those discussed herein. The computing device 1500 may be a head-mounted mixed-reality device configured to provide mixed reality elements as part of a real-world scene being viewed by the user wearing the computing device 1500.

Figure 4:
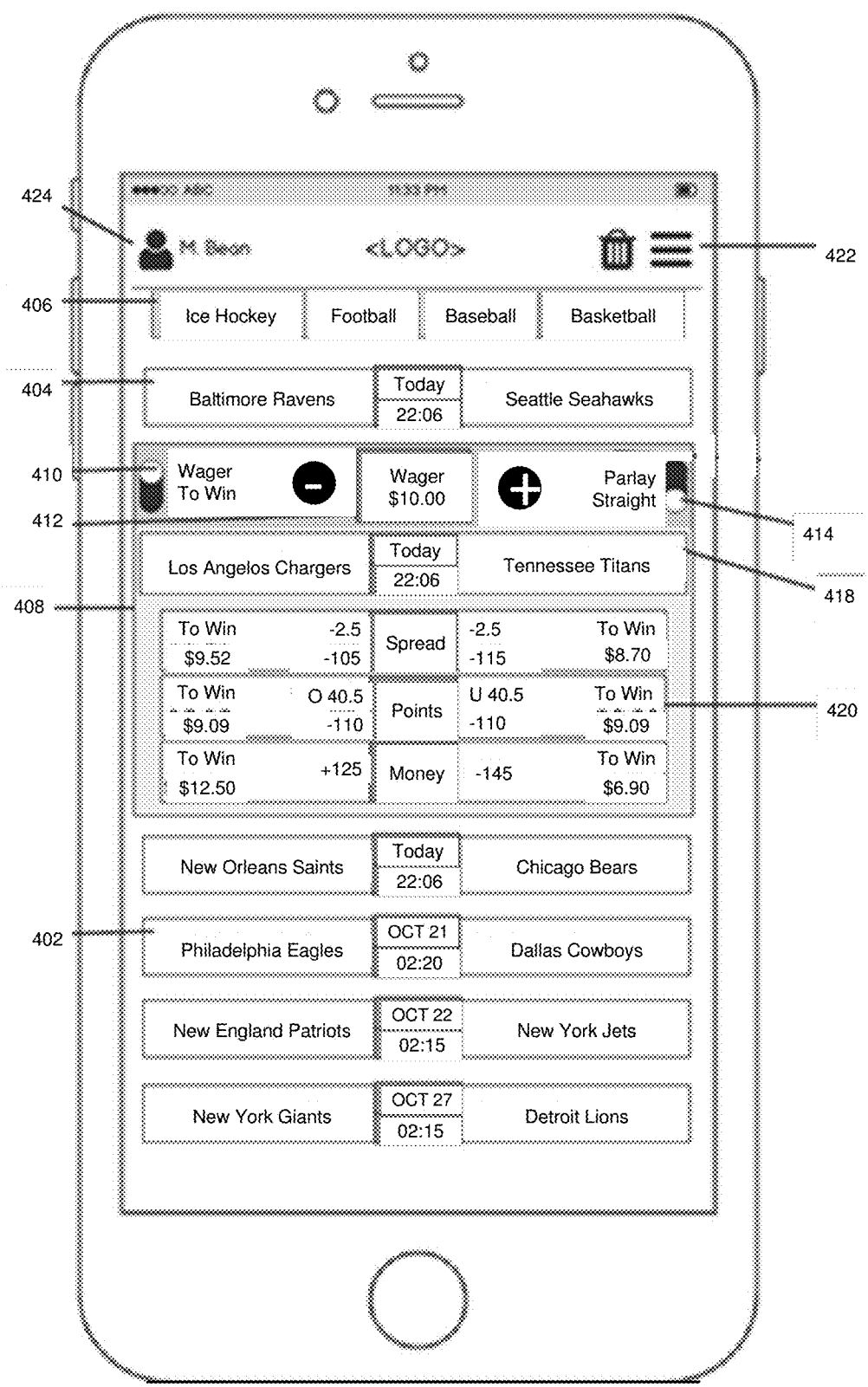
FIG. 4 is a schematic front view of a mobile device displaying a screenshot of a graphical user interface according to some embodiments.

Reference is now made to FIG. 4, which is a schematic front view of a mobile device displaying a screenshot of a graphical user interface according to some embodiments. As illustrated, the screen may include event/games list 402, 404 and a fixed wager section 408 that may correspond to multiple wagering options. In some embodiments, the wager section 408 may include current event/game and offered outcomes.

In some embodiments, a player may scroll up and down the event/game list to position the desired event/game under the fixed wager outcome section 408. Some embodiments provide that the player swipes left and right to move among sports and/or other wagering groups.

In some embodiments, in the list of events/games 402, 404 may indicate that the event list may expand over wager section. Some embodiments provide that lists of events/games may include event/game items. Such items may be arranged to provide that on the left side each event/game item shows an away team and on the right side each event/game item shows the home team. In the middle, event/game items may include date and/or time of the event/game. In some embodiments, sports such as baseball may further include a pitcher's name specified in the second line. In some embodiments, as player scrolls events/games, the mobile device may provide haptic feedback such as a gentle vibration that corresponds to the scrolling action.

Some embodiments provide that a player can swipe left or right to change event groups or sports. For example, a left or right scrolling may change from a first sport, such as ice hockey to a second sport, such as football. An event group indicator 406 may use a tabbed design to show event/game groups or sports. An active tab may change as the player swipes left or right on the event/game list. In some embodiments, a player may select a different event/game group by pressing a tab that corresponds to the desired event/game group.

Some embodiments may include a wager section 408 that may be a fixed section on the screen. The wager section 408 may include wagering options inputs 410, 412, and 414, a selected event section 418 and an event outcomes section 420. As a player preference, the wager section 408 section can be docked to the top of the screen, however, the player may select that the wager section 408 is located closer to the middle of the screen to allow easier access single hand use while preserving enough space for event scrolling.

In some embodiments, a wagering options section includes a perspective selector 410, an amount control 412 and a wager type selector 414. In some embodiments the amount control is positioned between the perspective selector 410 and the wager type selector 414. For example, the perspective selector 410 may be on the right side of the screen, the amount control 412 may be in the center and the wager type selector 414 may be on the left side. Such embodiments are non-limiting.

Some embodiments provide that the perspective selector 410 may be used to specify wagering preferences before identifying which events/games are the subject of the wagers. In some embodiments, the perspective selector 410 allows the player to select whether to play by specifying a wager amount (i.e., investment) or to play using wagering outcomes based on prospective winning amount (i.e., profit). In some embodiments, the player may change perspective at any point in determining the wager and values will be recalculated.

Some embodiments provide that the amount control 412 allows players to specify a wager amount that may apply to subsequently placed bets. Depending on the perspective option 410, the specified amount can be the amount player wants to wager (i.e., invest) or the amount player aims to win (i.e., profit). Specifying amounts of wager type may speed up wager creation because players may tend to repeat their wagering patterns (e.g., betting $10 straight wagers, or betting $2 parlay wagers.)

In some embodiments, the wager type selector 414 may allow a player to select whether he wants to play straight or parlay wagers.

Some embodiments may include an elected event section 418 that displays the currently focused event. In some embodiments, the away team data may be displayed on the left side and the home team data may be displayed on the right side, however, such arrangement is non-limiting. In some embodiments, center section of the elected event section may display starting event date and time. In some embodiments, visual element such as light magnification and/or colors may be used to express the focus.

Some embodiments may include an event outcomes section 420 that displays designated outcomes for selected events. For example, rows may include a point spread row, a total points row and a money line market row, among others. Each row may include boxes on one side that correspond to the away team outcome (selection) and boxes on another side that corresponds to the home team outcome. In the current example, the spread box on the right (Home) side shows a line of (−2.5), the odds (−110), and prospective win ($9.09). The prospective win may be calculated from the previously specified wagering perspective ("wager"), specified amount ($10) and outcome price (−110). If player specified the wagering perspective "To Win", the prospective win would turn into a wager amount that is required to gain the specified winning, which in the current example would be $11.

Some embodiments include a parlay control section 422. The parlay control section may include a "betting slip" button used for parlay wagers and trash button for clearing selection. Some embodiments include an account section 424 that includes player-specific information.

Figure 5:
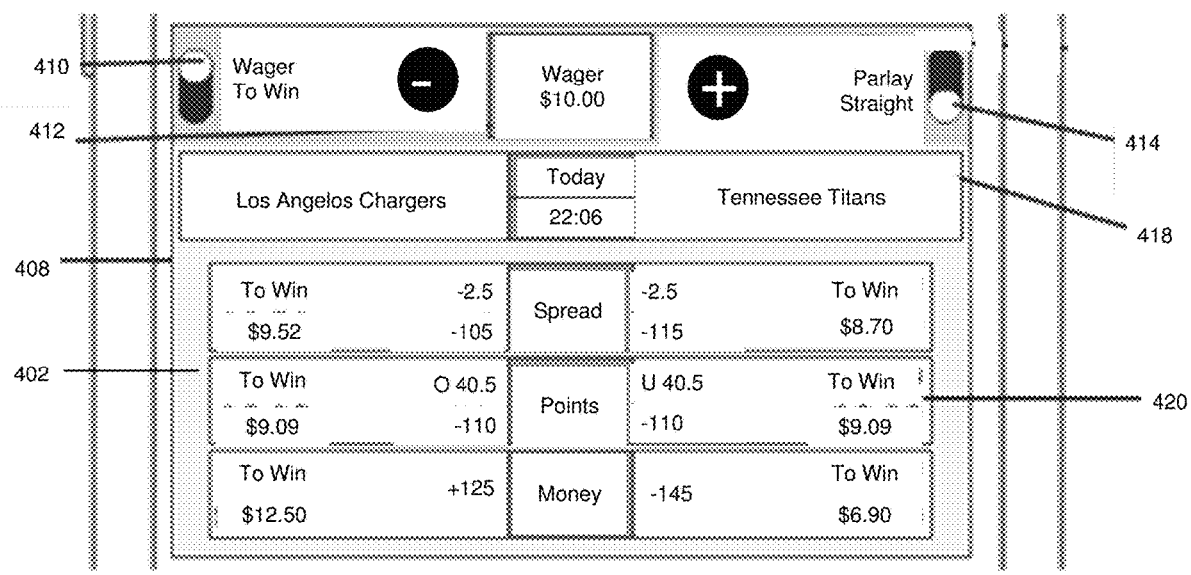
FIG. 5 is a schematic front view of a mobile device displaying a partial screenshot of a graphical user interface as illustrated in FIG. 4 for constructing a straight wager according to some embodiments.

Reference is now made to FIG. 5, which is a schematic front view of a mobile device displaying a partial screenshot of a graphical user interface as illustrated in FIG. 4 for constructing a straight wager according to some embodiments. According to this example, a player may use the perspective selector 410 to select to play by specifying a wager amount and not a prospective winning amount. The player may then use the amount control 412 to specify a $10 wager amount. The player may then use the wager type selector 414 to select a straight wager type.

Continuing with the example, the player may scroll up and down the event list section 402 to select the game he wants to bet. In this example, the player puts Los Angeles Chargers Tennessee Titans game in focus to display the event description in the elected event section 418. In response, six wagering outcomes 420 are presented in a compressed form. The compressed form includes:

Spread (point spread)—Chargers to win by more than +2.5-point difference, price −105, the player stands "to win" $9.52 (for invested $10—specified in the box 412);

Spread (point spread)—Titans to win by more than −2.5-point difference, price −115, the player stands "to win" $8.70;

Points (Under/Over)—Chargers to have over 40.5 points, price −110, the player stands to earn $9.09;

Points (Under/Over)—Titans to have under 40.5 points, price −110, the player stands to earn $9.09;

Money (line)—Chargers to win, price +125, the player stands "to win" $12.50; and Money (line)—Titans to win, price −145, the player stands "to win" $6.90.

Note that, at any time the player can modify the preset wager amount, and the potential winnings of all outcomes which are currently in focus would be recalculated. Additionally, the player can modify the preset wagering perspective for Wager to "To Win" 410. Switching "To Win" wagering perspective allows the player to specify the desired winning amount. When used in that mode, instead of prospective winnings, wagering outcomes will show wager amounts necessary to achieve desired winnings.

After the player selects the outcome (e.g., Money line-Chargers), a confirmation pop-up will be displayed. After player confirms the wager using the confirmation pop-up, the wager will be placed. Confirmation popup may be beneficial in preventing accidental wagers.

Figure 6:
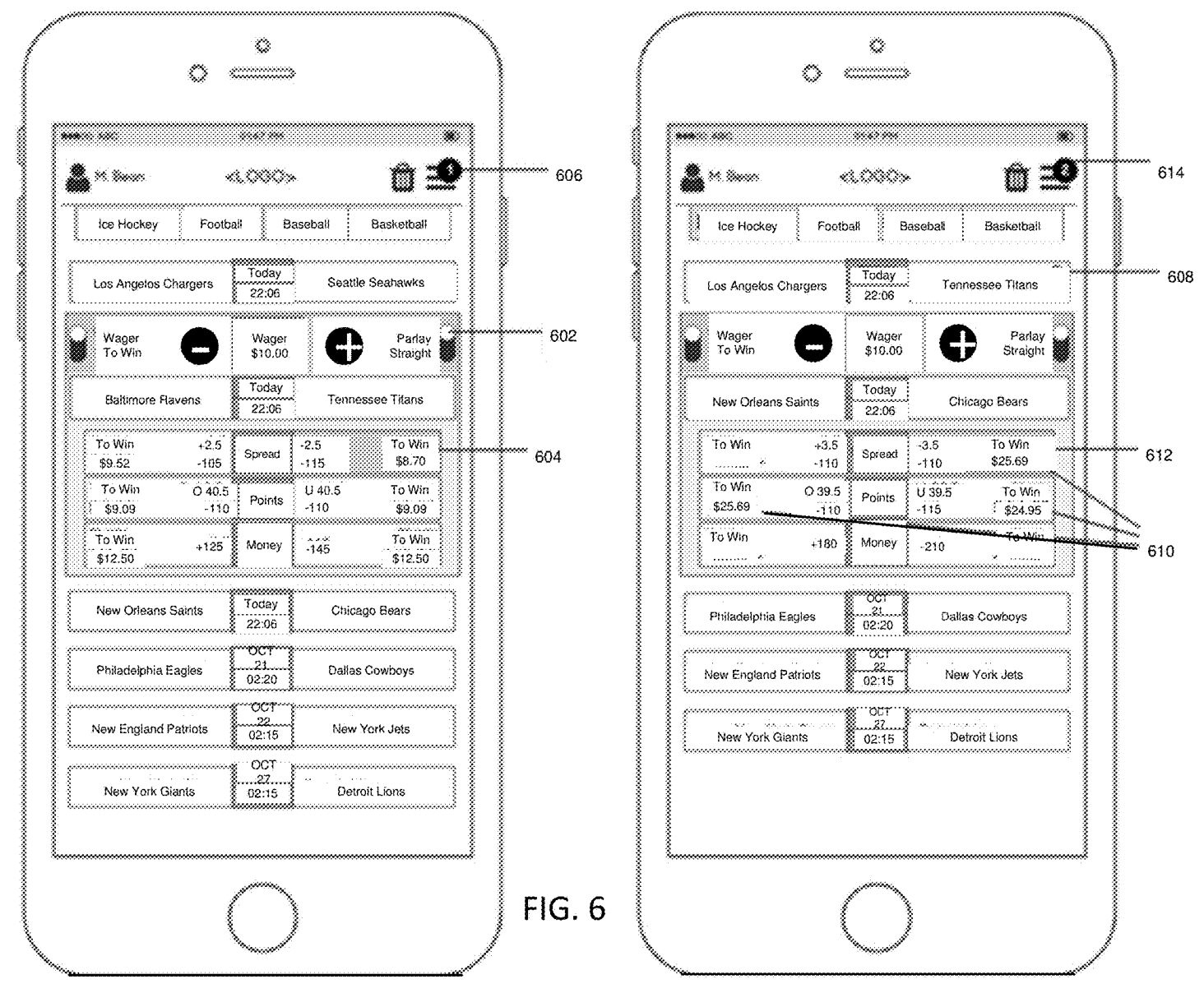

Reference is now made to FIG. 6, which includes two schematic front views of a mobile device displaying a screenshot of a graphical user interface as illustrated in FIG. 4 for constructing a parley wager according to some embodiments. Several of the operations for constructing a parlay wager may be the same as those discussed above regarding constructing a straight wager. As such, this discussion will focus on the differences in constructing a parlay wager according to some embodiments.

The first operation for constructing the parlay wager includes selecting the wager type 602 to be in the parlay position. Similar to constructing the straight wager, the player navigates to the desired game and picks the outcome. In this case, instead of placing a wager, selecting the outcome 604 causes the event/game to be added to a betting slip 606. The selected game is automatically flagged 608 and the player navigates to add more outcomes to his parlay wager.

As the player selects the second event/game (e.g., Saints @ Bears), the previous outcome odds with the outcomes currently in focus and shows prospective winnings as-if the player selected the outcome. The prospective winnings 610 are displayed as if winnings resulted from accumulated odds (−115 and −110=256.9, −115 and −155=249.5).

The outcomes that cannot be parlayed (due to contingently related selections or something else) may be displayed as disabled or unavailable in some way. The player picks the second outcome Point Spread for Bears 612 and the event/game is added to the betting slip.

The player places (or cancels) the wager by tapping onto the betting slip icon 614 and confirms.

Figure 7:
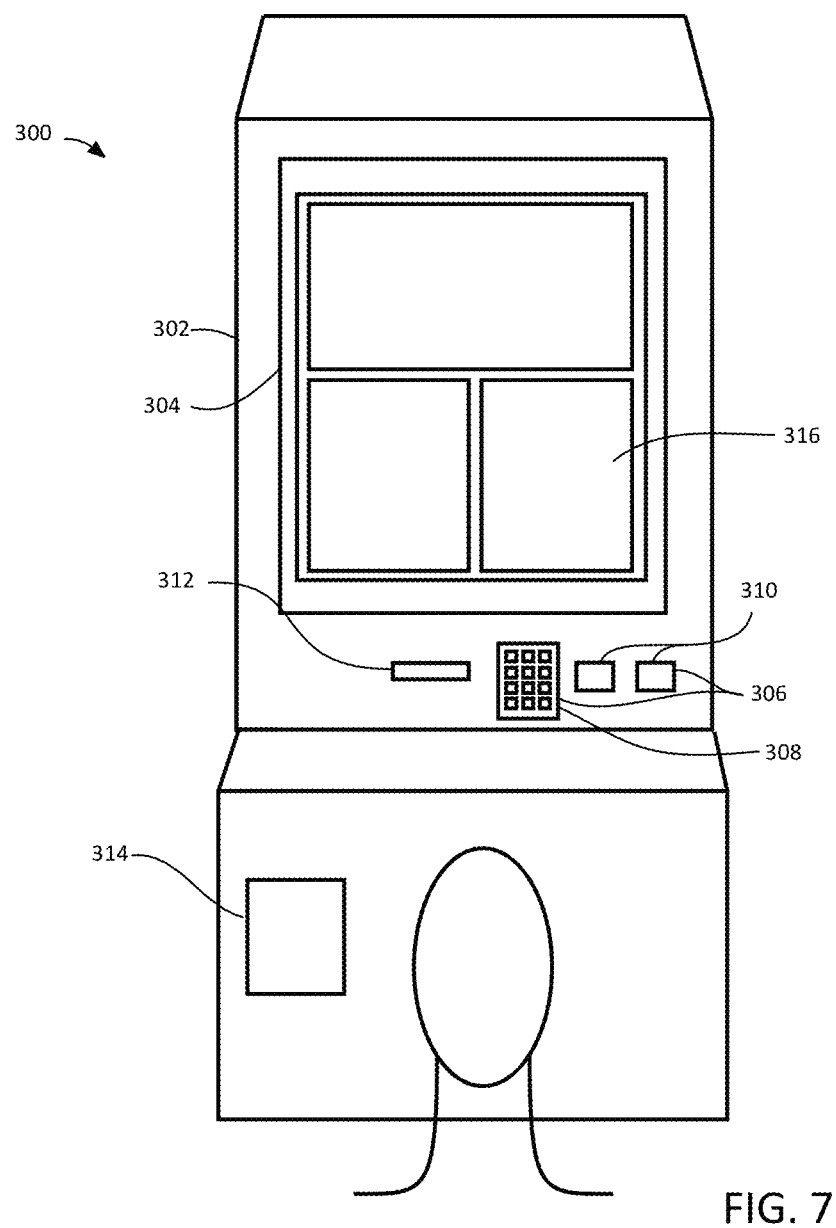
FIG. 7 is a schematic block diagram that illustrates a dedicated gaming terminal for constructing wagers corresponding to live sporting event according to some embodiments.

As used herein, a gaming device may include, for example, an electronic gaming device such as an electronic gaming machine (EGM), gaming terminal, etc., an electromechanical gaming device, a computing device such as a personal computer, a mobile computing device such as a tablet, smartphone, etc., or another device or devices. In this regard, FIG. 7 is a schematic block diagram that illustrates a dedicated gaming terminal for constructing wagers corresponding to live sporting event according to some embodiments. In some embodiments, the gaming terminal 300 includes a housing 302 having a display device 304, and a plurality of input devices 306, such as a keypad 308, buttons 310, etc., for receiving user input for playing the wagering game and otherwise interacting with the gaming terminal 300. In some embodiments, the display device 304 may include a touchscreen interface for receiving user input as well. The display device 304 may also be a single display device or may include multiple display devices, such as a first display device for displaying video of the live sporting event and a second display device for displaying gaming and wagering information for example. The gaming terminal 300 may include additional specialized hardware as well, such as an acceptor 312, for receiving currency (i.e., bills and/or coins), tokens, credit or debit cards, or other physical items associated with monetary or other value. The gaming terminal 300 may also include a dispenser 314, for dispensing items, such as physical items having monetary or other value (e.g., awards or prizes) or other items.

The gaming terminal 300 may include a processor circuit and a memory coupled to the processor circuit. The memory may include machine-readable instructions that, when executed by the processor circuit, cause the processor circuit to perform operations for operating the gaming terminal 300 and/or other features described herein. In this example, the gaming terminal 300 may include a graphical user interface (GUI) 316 displayed by the display device 304 for providing the video and gaming information to the player.

Figure 8:
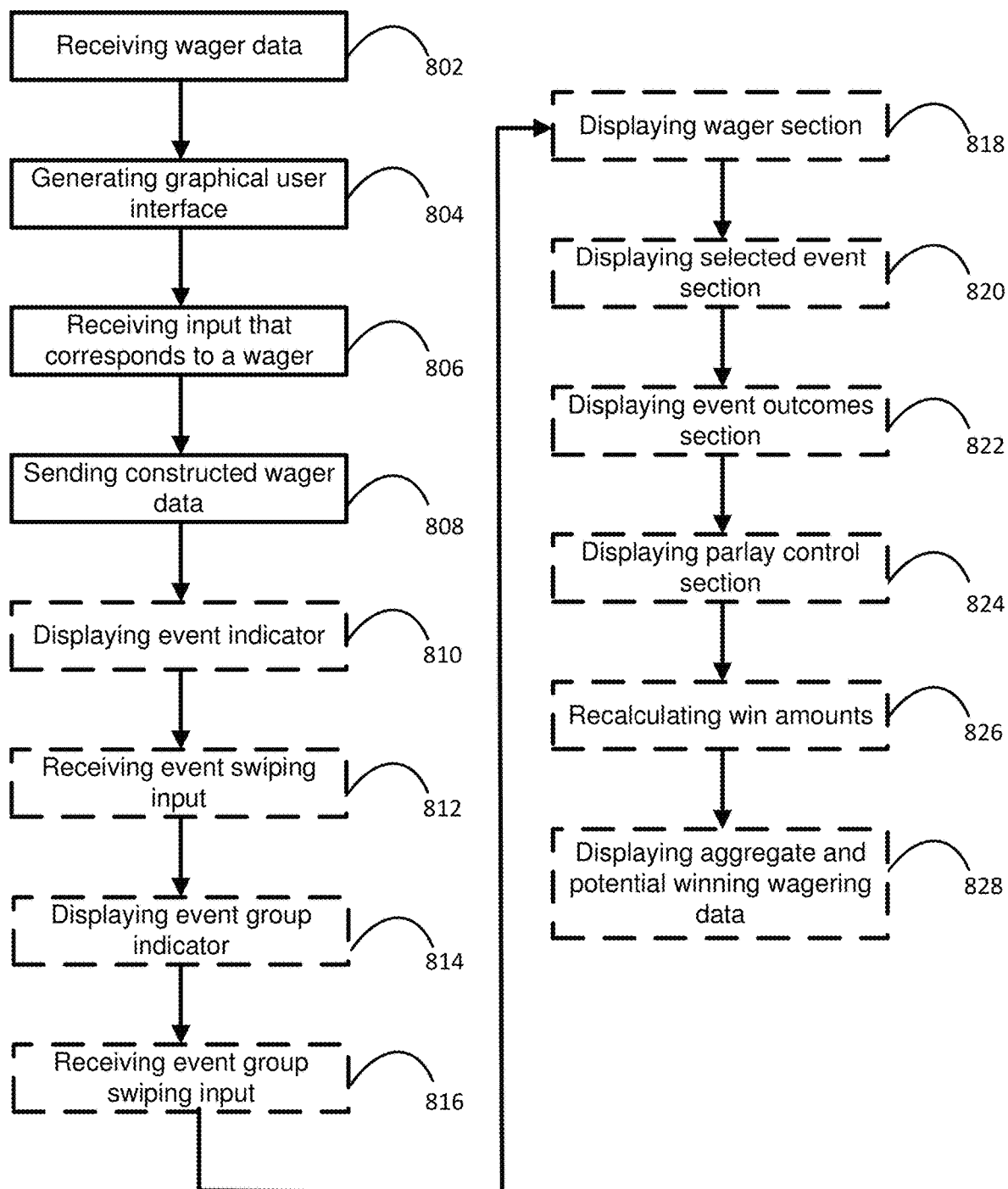
FIG. 8 is a flowchart illustrating operations of systems/methods according to some embodiments.

These and other features may be implemented as operations that may be executed by a processor circuit of a computing device. Reference is now made to FIG. 8, which is a flowchart illustrating operations of systems/methods according to some embodiments. Operations may include receiving (block 802) wager data corresponding to multiple of events and wagers and/or wager opportunities. For example, received data may include the identification of past, current and/or upcoming events/games that may correspond to one or more wagers and/or wagering opportunities. Data may include event/game participant information, date/time spreads, points, weather, and/or other data that would be required or beneficial when evaluating wagering opportunities.

Figure 9:
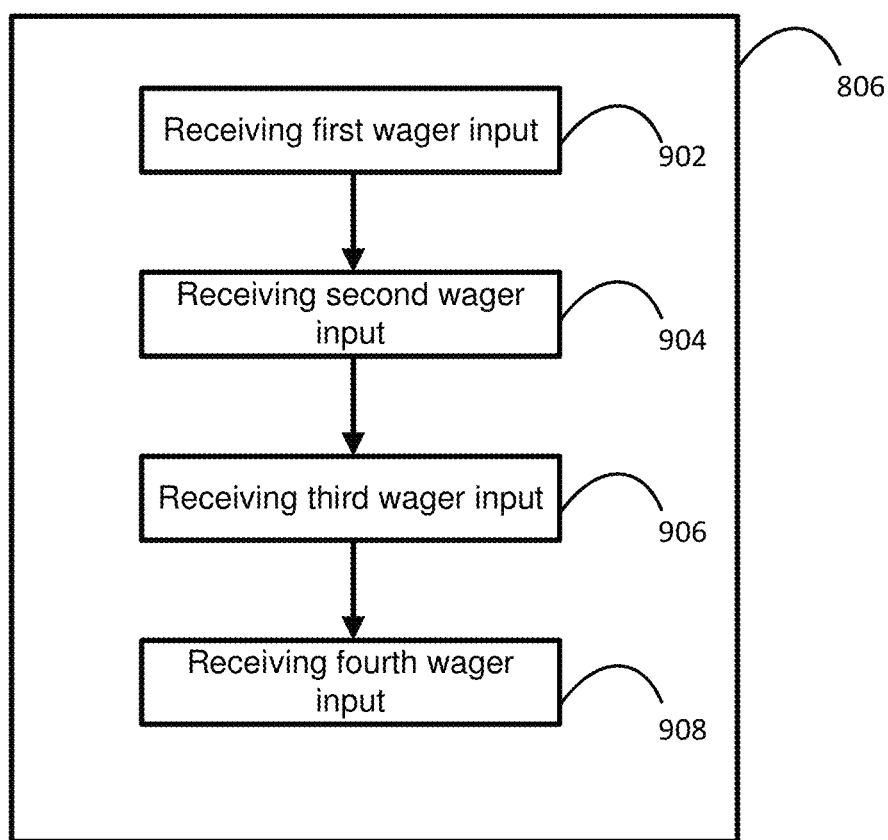
FIG. 9 is a flowchart illustrating operations of systems/methods according to some embodiments.

Operations include generating (block 804) a graphical user interface (GUI) on a display device of a mobile device or other device that includes a processor circuit, a memory and a display. Operations include receiving (block 806), via the GUI, an input that corresponds to a wager. Brief reference is made to FIG. 9, which is a flowchart illustrating operations of systems/methods of receiving (block 806) the input that corresponds to a wager. According to some embodiments the input comprises a first wager input, a second wager input, a third wager input and a fourth wager input. Operations include receiving (block 902), via the GUI, the first wager input that selects a wagering type. After receiving the first wager input, operations include receiving (block 904), via the GUI, the second wager input that selects a wagering amount. Operations may include, after receiving the second wager input, receiving (block 906), via the GUI, the third wager input that selects a first event of the events corresponding to the wager and that is based on the first wager input and the second wager input. Operations may include after receiving the third wager input, receiving (block 906) the fourth wager input that selects a second event of the events corresponding to the wager and that is based on the first wager input, the second wager input and the fourth wager input.

Referring back to FIG. 8, operations include sending (block 808), via a communication interface and to a wagering server, constructed wager data corresponding to the wager defined by the first wager input, the second wager input and the third wager input. Some embodiments include sending, to the wagering server, constructed wager data corresponding to the wager defined by the first wager input, the second wager input and the fourth wager input. In some embodiments, the second wager input that selects the wagering amount is based on a target amount to win while some embodiments provide that the wagering amount is based on an amount to invest.

Some embodiments include displaying (block 810), via the GUI, an event indicator that identifies ones of the events and event specific data corresponding to the events and receiving (block 812), via the GUI, an event swiping input that causes the event group indicator to scroll to display different events. In some embodiments, the event specific data corresponding to the events includes home/away indication corresponding to where the event/game will be played and/or event date/time information.

In some embodiments, the event indicator includes a focus function that, responsive to an event being selected as a selected event, causes the selected event to include a modified appearance and generates and/or displays expanded wagering outcomes corresponding to the selected event.

Embodiments may further include displaying (block 814), via the GUI, an event group indicator that identifies an event group and receiving (block 816), via the GUI, an event group swiping input that causes the event group indicator to scroll to display different event groups.

Some embodiments include displaying (block 818), via the GUI, a wager section. The wager section may include a perspective selector to receive a perspective input to select between wagering outcomes based on a prospective winning amount or based on an investment amount. Some embodiments provide that the wager section includes an amount control selector to receive an amount input to select the amount a player wants to invest or an amount the player wants to win.

Some embodiments provide that, in response to receiving the amount input to the amount the player wants to invest, operations include determining the corresponding amount that the player may win and, in response to receiving the amount input to the amount the player wants to win, operations include determining the corresponding amount that the player will invest.

Some embodiments provide that the wager section includes a wager type selector to receive a wager type input to select between a straight wager or a parlay wager.

Some embodiments include displaying (block 820), via the GUI, a selected event section that includes identities of event participants and an event starting date/time. In some embodiments, operations include displaying (block 822), via the GUI, an event outcomes section to display designated outcomes for a selected event. Operations may include displaying (block 824), via the GUI, a parlay control section that receives a parlay control input for selecting either a straight play or a parlay play and a cancel input that erases previously selected events in the parlay play. In response to receiving a parlay control input that selects the parlay play, operations further include recalculating (block 826) win amounts of unselected events based on selected ones of the unselected events.

Some embodiments include displaying (block 828), via the GUI, an accounts section that includes aggregate and potential winning wagering performance data corresponding to a given time period.

Figure 10:
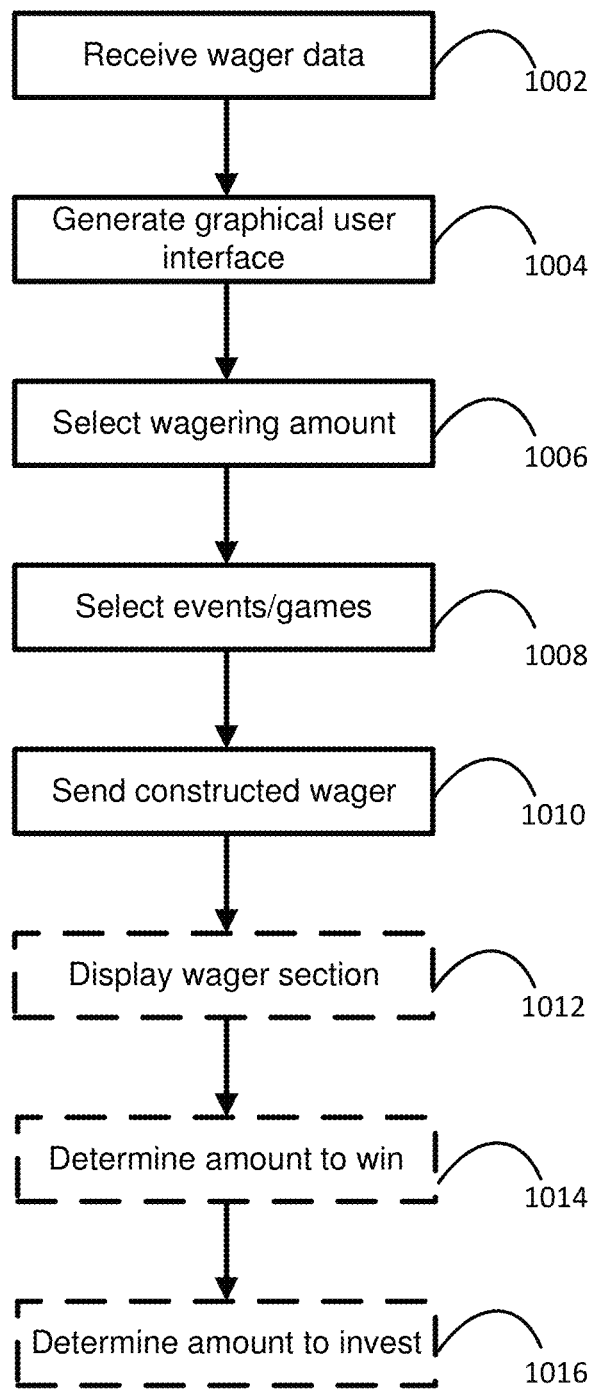
FIG. 10 is a flowchart illustrating operations of systems/methods according to some embodiments.

Reference is now made to FIG. 10, which is a flowchart illustrating operations of systems/methods according to some embodiments. Operations include to receive (block 1002), from a wagering data server, wager data corresponding to multiple events and wagers and to generate (block 1004) a graphical user interface (GUI) on a display device that receives, via a touch screen input, a first wager input, a second wager input and a third wager input. In some embodiments, the first wager input selects a wagering type. After receiving the first wager input, the second wager input selects (block 1006) a wagering amount. In some embodiments, after receiving the second wager input, the third wager input selects (block 1008) events/games corresponding to the wager that is based on the first wager input and the second wager input.

Some embodiments include to send (block 1010), via a communication interface and to the wagering server, wager data corresponding to the wager defined by the first wager input, the second wager input and the third wager input. In some embodiments, operations include to display (block 1012), via the GUI, a wager section that includes a wager type selector to receive a wager type input to select between a straight wager or a parlay wager. Some embodiments provide that, responsive to receiving an amount a player wants to invest, operations are further to determine (block 1014) a corresponding amount that the player may win and, responsive to receiving an amount the player wants to win, operations are to determine (block 1016) a corresponding amount that the player will invest.

Figure 11:
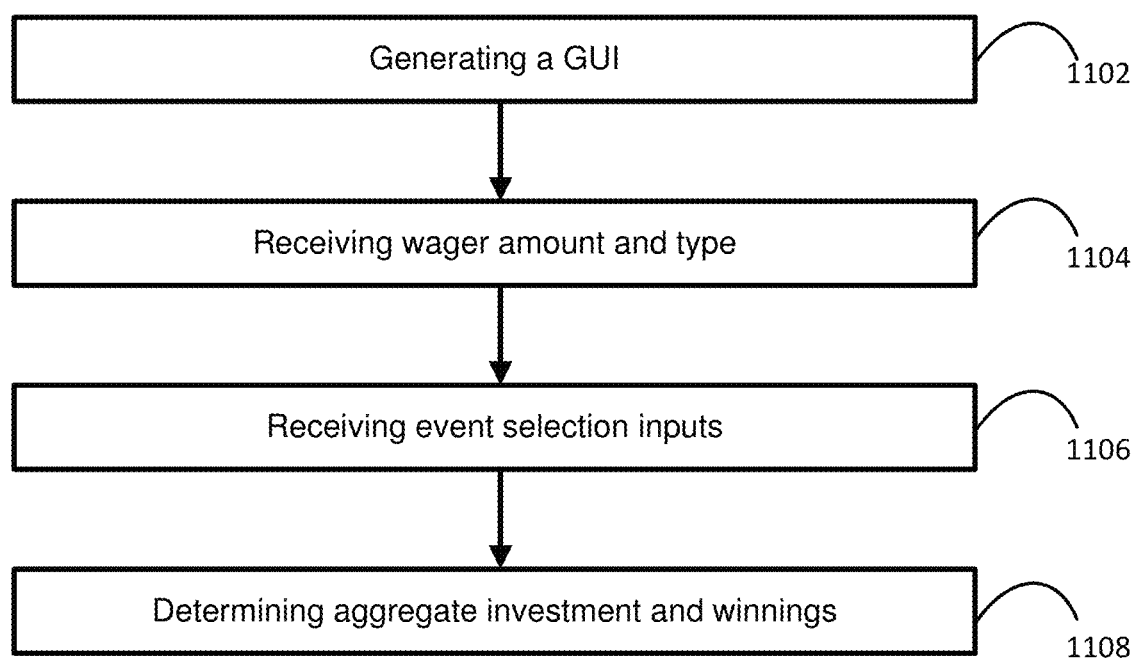
FIG. 11 is a flowchart illustrating operations of systems/methods according to some embodiments.

FIG. 11 is a flowchart illustrating operations of systems/methods according to some embodiments. Operations may include generating (block 1102) a graphical user interface (GUI) that comprises two axis display control. The two-axis control may be used to determine a selected event group along a first axis and to determine multiple events along a second axis. Operations may include receiving (block 1104) wager amount data and wager type data via the GUI. Some embodiments include, after receiving the wager amount data and the wager type data via the GUI, receiving (block 1106) event selection inputs corresponding to the events and determining (block 1108) an aggregate total amount of wager investment and winnings based on outcomes of selected ones of the events.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks. The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A computer implemented method of constructing sports wagers, comprising:
   generating a graphical user interface (GUI) on a display device that receives an input that corresponds to a wager, wherein the input comprises a first wager input, a second wager input and a third wager input;
   receiving, via the graphical user interface, the first wager input that selects a wagering type;
   after receiving the first wager input, receiving, via the graphical user interface, the second wager input that selects a wagering amount, and receiving, via the GUI, the third wager input that selects a first event of the plurality of events corresponding to the wager that is based on the first wager input and the second wager input;
   after receiving the second wager input, receiving, via the GUI, the third wager input that selects a first event of the plurality of events corresponding to the wager that is based on the first wager input and the second wager input; and
   sending, via a communication interface and to a wagering server, constructed wager data corresponding to the wager defined by the first wager input the second wager input and the third wager input.

2. The method of claim 1, wherein the wager is further defined by the third wager input.

3. The method of claim 2,
   wherein the input comprises a fourth wager input, and
   wherein the method further comprises:
   after receiving the third wager input, receiving the fourth wager input that selects a second event of the plurality of events corresponding to the wager and that is based on the first wager input, the second wager input and the fourth wager input; and
   sending, to the wagering server, constructed wager data corresponding to the wager defined by the first wager input, the second wager input and the fourth wager input.

4. The method of claim 3, further comprising displaying, via the GUI, an event indicator that identifies ones of the plurality of events and event specific data corresponding to the plurality of events.

5. The method of claim 4, wherein receiving, via the GUI, an event swiping input that causes the event group indicator to scroll to display different events.

6. The method of claim 4, wherein the event specific data corresponding to the plurality of events comprises home/away indication.

7. The method of claim 4, wherein the event specific data corresponding to the plurality of events comprises event date/time information.

8. The method of claim 4, further comprising displaying, via the GUI, an event group indicator that identifies an event group and receiving, via the GUI, an event group swiping input that causes the event group indicator to scroll to display different event groups.

9. The method of claim 3, wherein the second wager input that selects the wagering amount is based on a target amount to win.

10. The method of claim 1, further comprising displaying, via the GUI, a wager section that comprises a perspective selector to receive a perspective input to select between wagering outcomes based on a prospective winning amount or based on an investment amount.

11. The method of claim 1, further comprising displaying, via the GUI, a wager section that comprises an amount control selector to receive an amount input to select the amount a player wants to invest or an amount the player wants to win.

12. The method of claim 11, wherein responsive to receiving the amount input to the amount the player wants to invest, the method further comprises determining the corresponding amount that the player may win.

13. The method of claim 12, wherein responsive to receiving the amount input to the amount the player wants to win, the method further comprises determining the corresponding amount that the player will invest.

14. The method of claim 1, further comprising displaying, via the GUI, a wager section that comprises a wager type selector to receive a wager type input to select between a straight wager or a parlay wager.

15. The method of claim 1, further comprising displaying, via the GUI, a selected event section that comprises identities of event participants and an event starting date/time.

16. The method of claim 1, further comprising displaying, via the GUI, an event outcomes section to display designated outcomes for a selected event.

17. A gaming device comprising:
a display device;
a processor circuit; and
a memory coupled to the processor circuit, the memory comprising machine-readable instructions that, when executed by the processor circuit, cause the processor circuit to:
generate a graphical user interface (GUI) on the display device that receives a first wager input, a second wager input and a third wager input;
wherein the first wager input selects a wagering type;
wherein after receiving the first wager input, the second wager input selects a wagering amount; and
send, via a communication interface and to the wagering server, constructed wager data corresponding to the wager defined by the first wager input, the second wager input, the third wager input, and a fourth wager input.

18. The gaming device of claim 17, wherein after receiving the second wager input, the third wager input selects multiple ones of the plurality of events corresponding to the wager that is based on the first wager input and the second wager input.

19. The gaming device of claim 17, wherein the processor circuit is further caused to display, via the GUI, a wager section that comprises a wager type selector to receive a wager type input to select between a straight wager or a parlay wager, wherein responsive to receiving an amount a player wants to invest, the processor circuit is further caused to determine a corresponding amount that the player may win.

* * * * *